United States Patent

Waugh

[15] 3,646,264

[45] Feb. 29, 1972

[54] METHOD OF ACQUIRING A MOVING TARGET

[72] Inventor: John D. Waugh, Abingdon, Md.

[73] Assignee: The United States of America as represented by the Secretary of the Army

[22] Filed: Sept. 11, 1969

[21] Appl. No.: 857,021

[52] U.S. Cl. .................................... 178/6.8, 178/DIG. 21
[51] Int. Cl. ........................................................... H04n 7/00
[58] Field of Search .................. 250/203 T; 95/36; 178/6, 6 T

[56] References Cited

UNITED STATES PATENTS 3,161,725  12/1964  Hotham ................................ 250/203
3,448,210  6/1969  Clayton ................................. 178/7.2

Primary Examiner—Robert L. Griffin
Assistant Examiner—Barry Leibowitz
Attorney—Harry M. Saragovitz, Edward J. Kelly and Herbert Berl

[57] ABSTRACT

In an electro-optical tracking system the target may be brighter than the minimum requirements for tracking but tiny and not large enough to be detected by the electro-optical device. The present method embodies defocusing the image so that it will appear larger and will fill enough of the field to be detectable.

Also, an ordinary target may be faint against a certain type of background and therefore difficult to discern. The present method employs a target with a sharply defined edge between an extra-bright target area and an extra-dark target area. This makes the target discernable against any kind of background. And, more importantly, it makes it possible to accurately detect the edges or outline of one area of the target as sharply contrasted with another area. In a modification for tracking a source of light a mask over the lens provides the sharply defined edge used for high-precision tracking.

1 Claims, 4 Drawing Figures

Patented Feb. 29, 1972 3,646,264
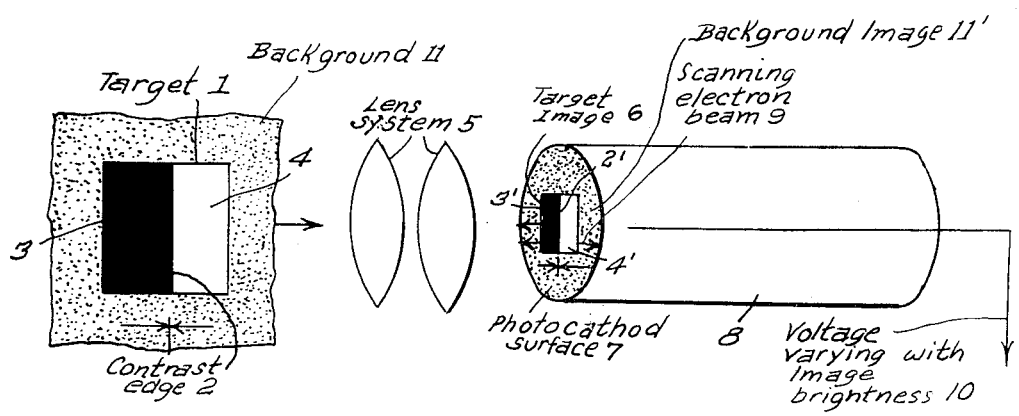
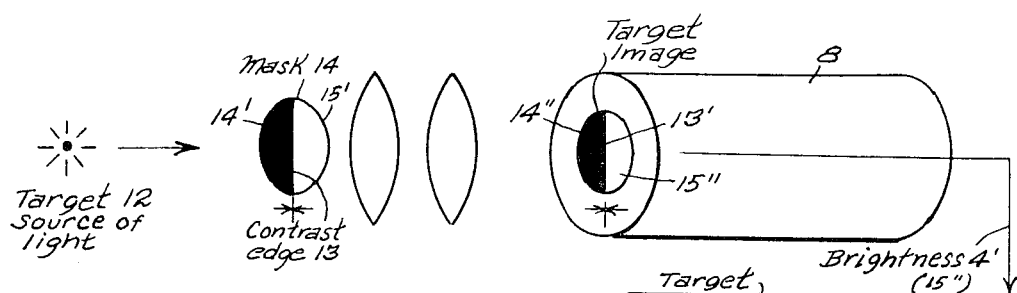
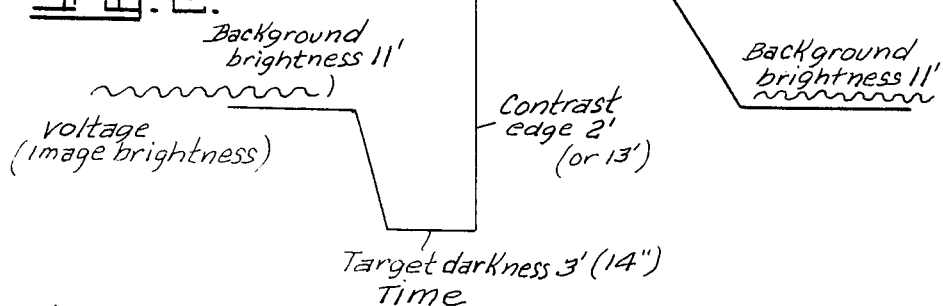
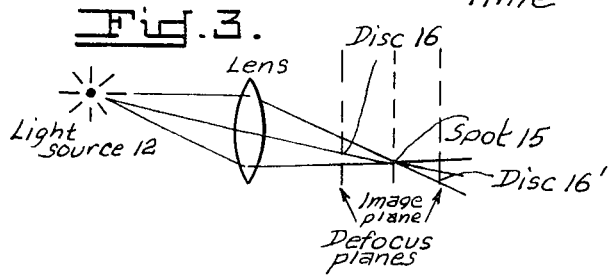
INVENTOR,
John D. Waugh
BY: Harry M. Saragovitz,
Edward J. Kelly &
Herbert Berl    ATTORNEYS.

METHOD OF ACQUIRING A MOVING TARGET

The invention described herein may be manufactured, used, and licensed by or for the Government for governmental purposes without the payment to me of any royalty thereon.

BRIEF SUMMARY

Electro-optical tracking devices depend, for high precision, on a sharp demarcation of brightness or contrast of a target placed upon an object being tracked. Also, electro-optical tracking devices typically require a target to occupy approximately 10 percent of the entire field of view. Therefore, at great distances, a target just cannot be made and carried which is large enough to be detected on an airplane, a helicopter, or such. For example, if the field of view is 500 feet square, a helicopter in the area would require a discernable target 50 feet square, too large for a small helicopter to support. By using a telephoto lens the field may be narrowed, but then the servosystem to keep the tracker focused on the helicopter target would have to be more complex and expensive and would have to move the tracker more often to keep the helicopter target in the field of view.

The target itself should stand out sharply in contrast with the background. If the night sky (dark) is the background, then a bright light, or an illuminated bright white spot, or cross, or other, stands out. If the background is a daytime blue sky, or white fleecy clouds, or gray clouds, then a jet black target, or jet black surrounding an ultrawhite area, is good for contrast. Bright colors are good for some types of backgrounds.

For the present method of tracking a target a sharp contrast of colors, with a sharp demarcation between the colors, enables the electro-optical system to see the target distinctly with a reduction of fuzziness where the colors join. This permits a higher precision of tracking. If the target is close to the electro-optical camera or tracking system of course the image of the target can be clearly and sharply focused with ordinary systems and methods. The camera's field of view can be rather wide under these conditions. However, by using the present method, even if the target moves out to a great distance away from the camera or tracking system, it can still be tracked without a telephoto lens and without narrowing the field of view of the system. When the target is reduced to less than a pinpoint image on the screen, too small to be seen or detected, the image is then defocused from a tiny focal spot to a larger focal area or disc. The image in a focal area, or defocused spot or disc, is still bright enough (or dark enough) against its background to be detectable. The larger image is again discernable, even though not as bright or sharply defined. And, the electro-optical system need not be reoriented by a tracker servosystem. Therefore, for some purposes, such as a helicopter landing site, it is possible to dispense with the servotracking mechanism, or to sharply reduce its use or sensitivity. The operator keeps the field of view wide and merely defocuses the lens-image to faintly bring the distant target into view on the screen. Then he, or the tracker, at least can follow the path of the target even though it is at a great distance. A fairly high degree of precision can be obtained by use of the sharp line of color demarcation illustrated in FIG. 1 or by use of a sharp-edged mask illustrated in FIG. 1A. The dramatic change is graphically illustrated in FIG. 2.

As the target comes closer, thereby increasing its size in proportion to the wide field of view, the lens-image can be brought into sharp focus in the usual manner. Even then, the sharp demarcation between the colors, or the sharp-edged mask in front of the lens, makes sharp focusing easier and lets the observer or the camera and tracking system see the precise leading edge, or trailing edge, or sharp outline of the target.

The present invention is particularly related to electro-optical tracking equipment in this specification and drawings.

IN THE DRAWING

FIG. 1 is a diagrammatic illustration of the invention with a passive, light-reflecting target and a lens with a photocathode scanning-beam pickup system;

FIG. 1A is an illustration of the invention with an active self-luminescent target and a mask over a portion of the lens to produce a sharp contrast edge;

FIG. 2 is a diagrammatic illustration of typical voltage output of the scanning-beam as it sweeps the field of view of the system;

FIG. 3 illustrates the principle of image defocusing.

FIG. 1 illustrates a front or rear illuminated target 1 having a sharply defined contrast edge 2 between strongly contrasting color areas 3 and 4, for example, dark black and ultrawhite. A lens system 5 projects an image 6 (2', 3', 4') of the target on the photocathode surface 7 of pickup tube 8. A scanning electron beam 9 sweeps from side-to-side and produces an output voltage 10 which is proportional to the brightness of the image at the area being scanned. Therefore, the voltage rises as the beam scans light areas such as 4 (4') and falls as the beam scans dark areas such as 3 (3'). The background 11 (11') for the target may vary from the black of night to the brightness of white fleecy clouds. Therefore, the output voltage corresponding with the background may be very low, medium, or high. However, the scanning voltage output differential will always be very high, as will become apparent hereinafter.

FIG. 1A illustrates the target 12 as self-luminescent, for example, a "point" source of light. In this embodiment a sharp contrast edge 13 (13') is obtained by using a mask 14 with a dark area 14' producing a dark image 14" and an open or transparent area 15' passing light to area 15". As target 12 begins to move into the field of view of the lens system from the side 14' of mask 14, it does not register. The mask blocks the image as it enters the field of view where the image could be distorted and hazy. When the image finally bursts through upon the photocathode surface screen 7, passing the edge 13' of the mask image 14", it is at full brilliance, abruptly, and the voltage output from the photocathode tube shoots up dramatically as illustrated in FIG. 2. Otherwise the function is similar to that described with reference to FIG. 1. In either case the target (and image) may take forms other than those illustrated, still having the sharp contrast edge.

FIG. 2 illustrates the effect of the various degrees of brightness in the field of view of the lens system and photocathode tube. This graphical representation of voltage plotted against time of electron beam scan illustrates the dramatic instantaneous voltage output change which enables high-precision tracking. The voltage with a typical gray background is illustrated as 11'. As the dark black area 3 (3') or 14' (14") is being scanned the voltage drops to near zero. As the bright area 4' (15") is being scanned the voltage rises dramatically, substantially instantaneously, to a very high level, just as the sharp contrast edge 2' (or 13') is passed. This abrupt voltage change, at a sharp, clearly defined point in time, enables the tracking equipment to respond with a high degree of precision and "lock on" to the sharp line of demarcation between colors. As taught in this invention this line is always sharp and distinctly defined. In the usual system and method of use the edge of the target is being detected and it generally is not so sharply defined as against the background. The dark edge of the target versus the background usually gives a fairly low value of contrast while the light edge versus the background gives another fairly low value. Although those values of contrast will be different for different backgrounds they generally will not nearly equal the sharp contrast at contrast edge 2' or 13'. On the contrary, applicant's target provides the maximum degree of contrast, at a sharply defined line, under all background brightness conditions.

FIG. 3 illustrates the solution of another problem. As a target of a given size is moved farther from the system it becomes too tiny to be detectable even though it may be bright enough. By defocusing the tiny image 15 it becomes a larger disc at an area such as is illustrated at 16 or at 16'. This disc is large enough to be detected. A relatively sharp line of contrast or demarcation of the image can still be obtained by use of a mask, as explained relative to FIG. 1A, or by use of the sharp color contrast on the target with the sharply defined line between the colors. If desired, the system may be brought more nearly or completely into focus as the target approaches the system and the image size increases. The defocused disc becomes a sharply focused image which can be more readily tracked or more precisely pinpointed as to its position or its contrast edge.

Possible modifications are apparent. As examples, if the electron beam scanning in the photocathode tube were from top-to-bottom the contrast edge 2 (2') should preferably run from left-to-right. Mask 14, instead of covering half of the lens, could cover one-quarter, leaving three-quarters of a disc of light, or could cover nine-tenths, leaving a wedge of light (one-tenth of a disc) pointing toward the center. L-shapes, straight lines, and other forms of sharply defined images could be produced.

The invention is particularly useful for application to electro-optical tracking of a target. However, the principles are deemed to be more broadly applicable. Electro-optical tracking involves imaging of electromagnetic radiations (light) and using the effect to activate tracking apparatus. The present invention teaches defocusing to increase the image size (with loss of some degree of resolution detail). The invention also teaches sharpening of the image by a mask or high-contrast target with a sharply defined contrast edge. And, the invention teaches sharp contrast between the background and an area or areas of the target.

I claim:

1. The method of acquiring a moving target, which comprises the steps of aiming the photocathode of a scanning tube in the direction of the target so that the target is in the field of view of said photocathode, placing a mask in the field of view of said photocathode to produce a sharp contrast edge on the surface of said photocathode, and defocusing the image of said target to a larger area on the surface of said photocathode, whereby upon the passage of the defocused image of said moving target across said contrast edge a sudden voltage change is produced in the electrical output of said scanning tube.

* * * * *